United States Patent [19]

Broberg et al.

[11] 4,354,899

[45] * Oct. 19, 1982

[54] DEVICE FOR CONCENTRATION AND POSSIBLE PURIFICATION OF MINERAL ACIDS, PARTICULARLY SULPHURIC ACID

[75] Inventors: Hans Broberg, Drostvägen; Lars Douren, Noravägen; John Troeng, Gesällgatan, all of Sweden

[73] Assignee: Aktiebolaget Bofors, Bofors, Sweden

[*] Notice: The portion of the term of this patent subsequent to May 26, 1998, has been disclaimed.

[21] Appl. No.: 215,978

[22] Filed: Dec. 12, 1980

Related U.S. Application Data

[63] Continuation of Ser. No. 41,168, May 21, 1979, abandoned.

[30] Foreign Application Priority Data

Jun. 21, 1978 [SE] Sweden ............................. 7807068

[51] Int. Cl.³ ............................................ B01D 1/06
[52] U.S. Cl. ..................... 159/13 A; 159/13 C; 159/28 D; 159/DIG. 42; 159/DIG. 15
[58] Field of Search .... 159/DIG. 42, 28 D, DIG. 15, 159/13 A, 13 C, DIG. 29, DIG. 27, 28 R; 422/307

[56] References Cited

U.S. PATENT DOCUMENTS

| | | | |
|---|---|---|---|
| 3,822,192 | 7/1974 | Brown | 159/DIG. 27 |
| 4,014,735 | 3/1977 | Guth et al. | 159/13 A |
| 4,138,309 | 2/1979 | Kuhnlein et al. | 159/13 A |
| 4,243,477 | 1/1981 | Broberg et al. | 159/13 A |
| 4,269,655 | 5/1981 | Broberg et al. | 159/13 A |

*Primary Examiner*—Norman Yudkoff
*Attorney, Agent, or Firm*—Pollock, Vande Sande & Priddy

[57] ABSTRACT

For concentration and possible purification of mineral acids, particularly sulphuric acid, a furnace which can be heated is utilized, in which one or several long quartz tubes are placed. The quartz tubes are sealed at the upper and lower parts of the furnace and inside the furnace the quartz tube is heated from the outside with the utilized means. The acid which is to be treated is fed to the respective quartz tube via the upper parts of this, and the purified acid is collected in a vessel located at the lower parts of the quartz tube. Packings of small and/or medium dimensions are arranged in the quartz tubes.

25 Claims, 14 Drawing Figures

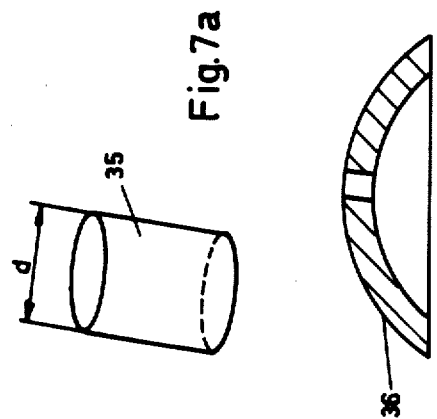
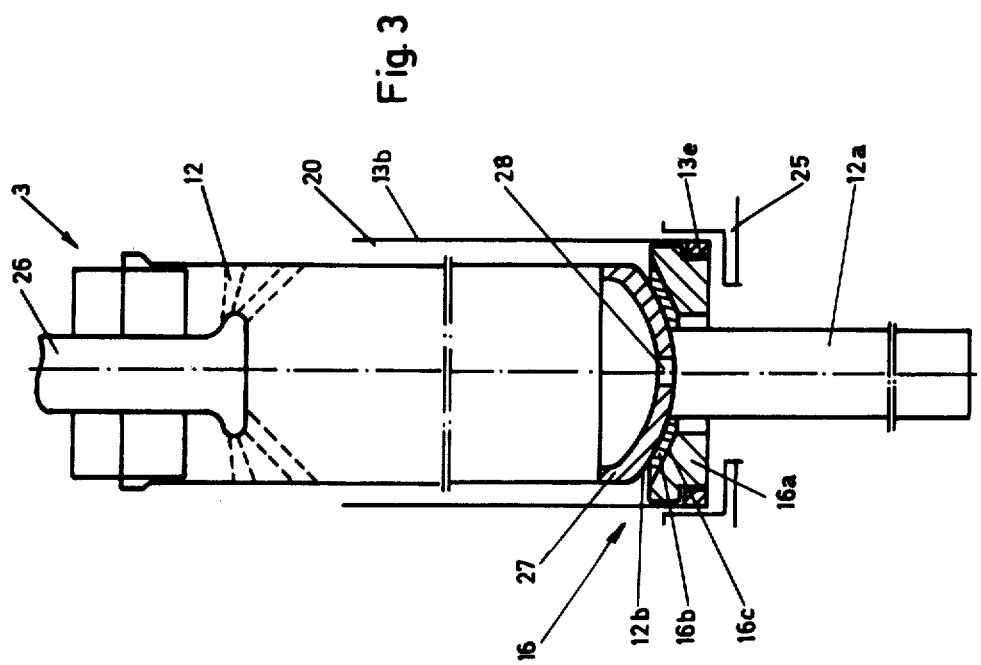

DEVICE FOR CONCENTRATION AND POSSIBLE PURIFICATION OF MINERAL ACIDS, PARTICULARLY SULPHURIC ACID

This is a continuation of application Ser. No. 041,168, filed May 21, 1979, now abandoned.

BACKROUND OF THE INVENTION

The present invention relates particularly to facilities for concentration, for instance, of sulphuric acid, in which the acid is fed to the inner space of one or a plurality of quartz tubes. Due to the poor conductivity of the quartz tube and the requirement that in certain cases it must endure working temperatures as high as 320° C., there is a pronounced desire to optimize the transmission of heat to and the receiving of heat in the quartz tube in various ways.

SUMMARY OF THE INVENTION

The main purpose of the invention is to create a device which solves these problems. The feature that can mainly be considered to be characteristic for the new device is that in a furnace which can be heated there are arranged one or a plurality of long quartz tubes which extend through seals arranged at the upper and lower parts of the furnace. The seals delimit the space for the means used for the heating and the long tube or tubes extend down into a collecting vessel for concentrated acid placed under the furnace. The feed of acid for concentration takes place at the top of the respective quartz tube. Packings are inserted in the respective quartz tube, at least in its lower parts the packings having been given medium and/or small dimensions.

In further developments of the concept of the invention, design-technical advantages are also obtained which enable great flexibility as regards capacity, variation in composition of the acid to be concentrated and so forth. As the device can work with a high temperature, it is also possible to integrate an efficient purification function which is favourable from the point of view of environment with the concentration process.

BRIEF DESCRIPTION OF THE DRAWINGS

The properties which can be considered to be characteristic for a device according to the invention will be described in the following, with reference to the accompanying drawings, in which FIG. 1 shows a skeleton diagram of a concentration device which is included in a system for handling residual acid. not shown in detail, FIGS. 2a-2b in vertical sections turned 90° in relation to each other show the embodiment of a design of the concentration device in the system according to FIG. 1, FIG. 3 in a vertical section shows inter alia a quartz tube comprised in the concentration device according to FIGS. 2a-2b, FIG. 4a in a vertical view shows a tube unit for the quartz tube according to FIG. 3, FIGS. 4b-4d in enlargements show various parts of the tube unit according to FIG. 4a, FIG. 5 in a horizontal section shows supporting plates for a number of quartz tubes and tube units according to FIGS. 3 and 4a, taken along line A—A in FIG. 2a FIGS. 6a-6c in horizontal and vertical sections show a sealing arrangement between an outlet channel and the tube unit according to FIG. 4a, FIGS. 6b and 6c being taken along lines B and C of FIG. 6a.

FIGS. 7a-7b in perspective and vertical section show two embodiments of packings utilized in the concentration device.

DESCRIPTION OF THE PREFERRED EMBODIMENTS

The facility described in the following is primarily intended for concentration of sulphuric acid, and is to a certain extent based upon so-called evaporation technique. This involves that sulphuric acid from which nitric acid has been removed is allowed to run along the inside of a quartz tube, which is heated from the outside with heating gases, e.g. combustion gases, from an oil burner. The water content in the sulphuric acid is thereby evaporated. For high concentrations of sulphuric acid, heating temperatures of up to 320° C. are required, which temperatures are sufficiently high so that the organic impurities present will be destroyed without residue, at least when an appropriate oxidation agent (e.g. nitric acid) is added, which involves that the device described also serves as a purification device. The acid concentration device shown is moreover primarily intended for used sulphuric acid from nitration processes and the like, i.e. sulphuric acid contaminated mainly with reasonable quantities of organic substance.

Figure 1:
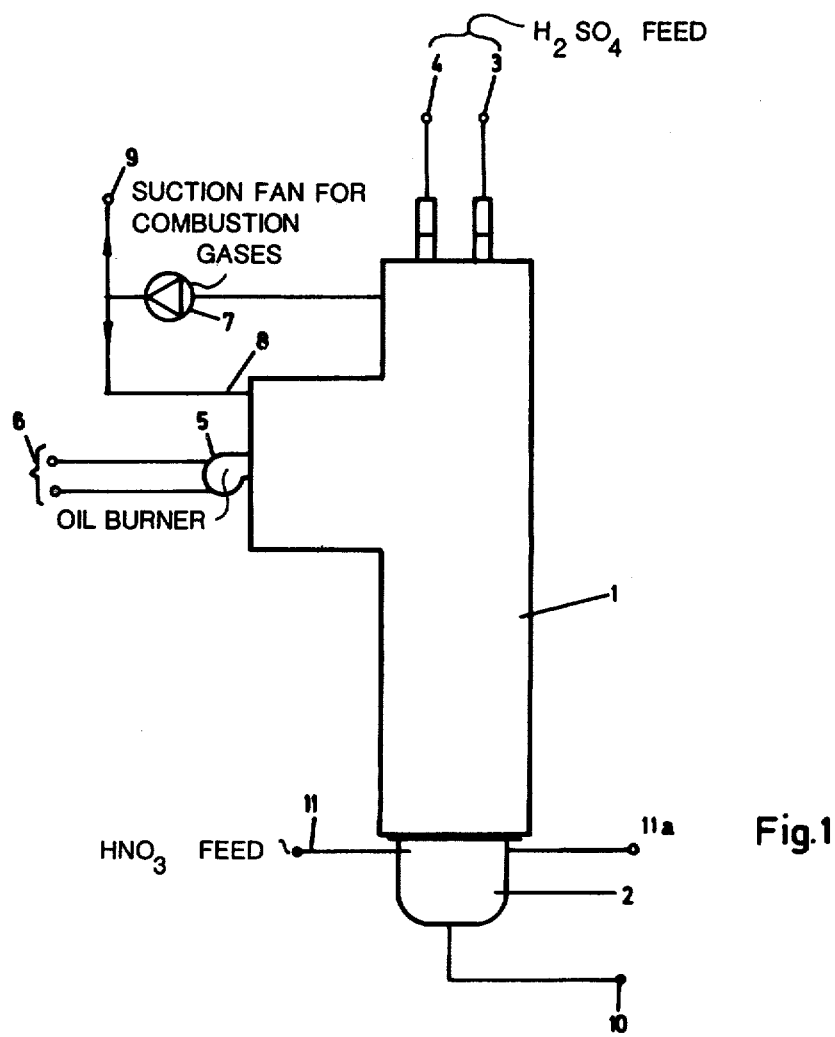

In FIG. 1, a concentration device is shown in principle, designated by the numeral 1, and a collecting vessel or container for acid concentrated in the device is designated 2. The acid which is to be concentrated is fed in inlet pipes 3 and 4. The concentration device comprises a furnace that can be heated which generates hot combustion gases by means of an oil burner 5, to which fuel oil and air are conveyed via pipes 6. A suction fan connected to the furnace is designated 7, which fan in the case shown has a capacity of the order of 13,000 m$^3$/h. The system has a return pipe 8 for part of said combustion gases, which are returned to the combustion chamber of the furnace in order to make it possible to maintain a constant temperature of said hot combustion gases. Said fan also conveys combustion gases to an air circulator via a connection 9. Said air circulator provides the flow of air for the burner 5. The concentrated sulphuric acid is conveyed off from the vessel 2 via an outlet pipe 10. Cold HNO$_3$ is fed via a pipe 11. A balance pipe is designated 11a.

In accordance with inter alia FIGS. 2a and 2b, the device 1 comprises a number of long quartz evaporating tubes 12 (cf. also FIG. 3) which respectively are arranged in a tube unit 13 (cf. also FIG. 4a) in the way described in more detail in the following. In the example of the embodiment, the quartz tubes have a length of approx. 5 meters, but can in principle vary between for instance 3 and 10 meters. Further, the inner diameter is approx. 125 mm, and appropriate variations for this inner diameter are for instance between 100 and 200 mm. The quartz tubes are made of a quality (e.g. clear quartz) which has comparatively good heat conducting capability and strength. The tubes have a thickness of material of 4–12 mm and a weight of for instance 6–7 kg.

Said tube unit 13 is made of fire-resistant steel material. As will be noted from FIG. 4, the tube unit has double walls along substantial parts of its longitudinal extent. By a double-walled tube unit is meant in the present case the embodiment according to which the tube unit in principle consists of two tubes 13a and 13b which are separate from each other, and which are supported individually. However, the designation double-walled also includes the case when the two coaxially arranged tubes are connected to each other. The tube unit in question is somewhat shorter than the quartz tubes belonging to it, and in the present case has a length of approx. 4.2 meters, the tube unit then being double-walled from its lower parts up to 25-70% of its height. A space formed between the walls is designated 13c.

Figure 2A:
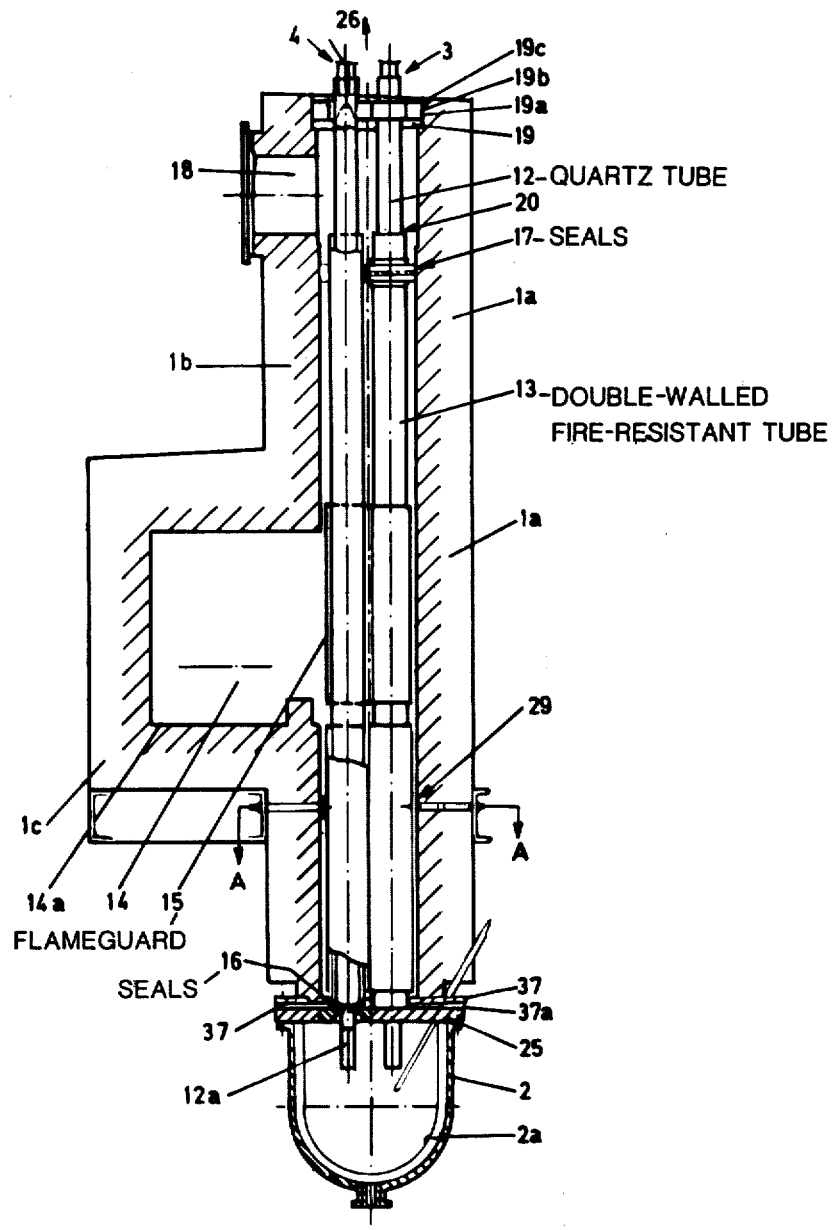
Figure 2B:
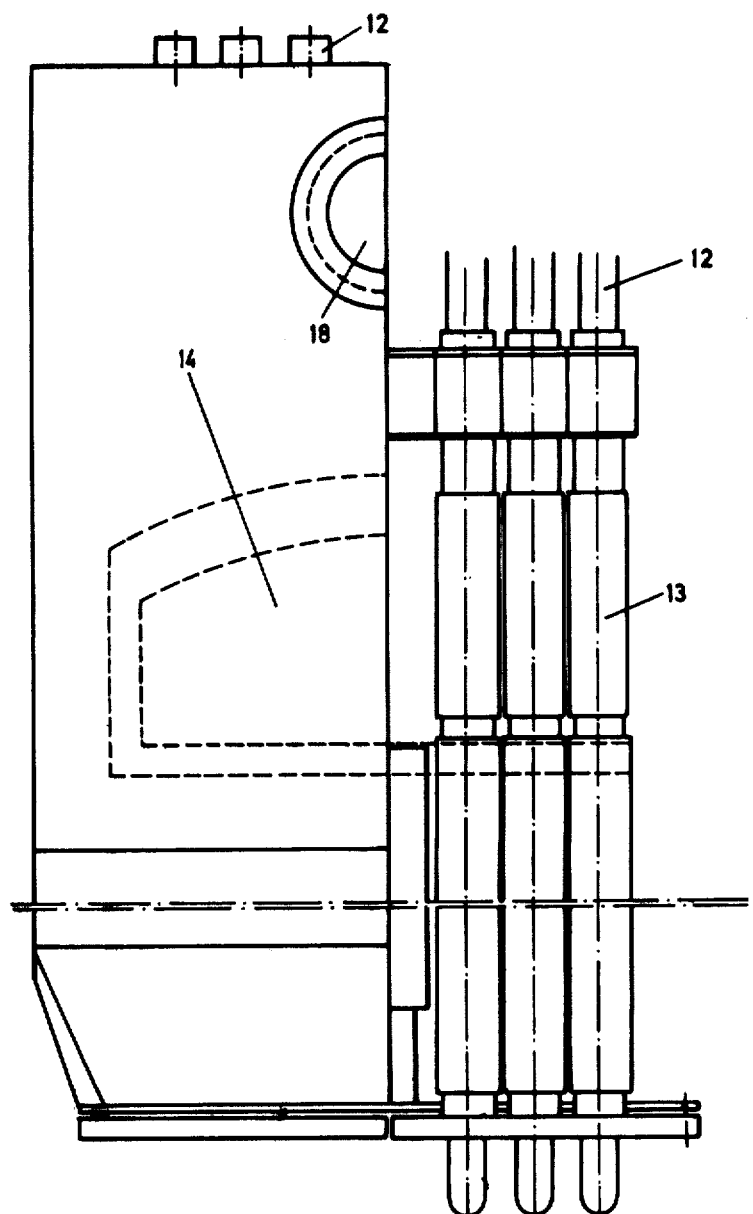

If FIGS. 2a and 2b are regarded again, it will be noted that the furnace comprises a combustion chamber 14, in which the oil injected is mixed with air and combusted. Said returned heating gases are directed into the furnace so that they will come in front of the flame. The quartz tubes and tube units extend with sections past said combustion chamber, and the tube units 13 have flame guards 15 on the outside. At the lower parts, the quartz tubes extend sealed through the lower part of the furnace and down into the vessel or container 2. The seals, which are symbolized by inter alia 16 will be described in more detail in the following. The tube units 13 are substantially fixed inside the furnace. At their upper ends, both the quartz tubes and their respective tube units extend through further seals symbolized by 17 and described in the following, which separate the combustion chamber 14 of the furnace from an outlet channel 18, which is connected to the above-mentioned combustion gas fan 7 (FIG. 1). The quartz tubes 12 also extend entirely through said outlet channel 18 and up and through a fastening unit 19, which primarily holds the quartz tubes fixed transversally, but also achieves a seal between the combustion gas outlet 18 and the atmosphere. Further, in the case shown, the tube units are supported at 29 by means of supporting plates described in the following which coact with the outsides of the outer walls of the tube units. In certain embodiments, however, it is appropriate to eliminate said supporting plates entirely.

The double wall of the tube unit 13 extends substantially to a level with the bottom plane 14a of the combustion chamber, which involves that the space 13c between the double walls will be in direct connection with the combustion chamber. As will be noted from FIG. 2a, the quartz tube 12 is arranged in its tube unit with play, which is designated 20 in FIG. 2a, in relation to the inner wall of the tube unit. The space between said inner wall (13b in FIG. 4b) and the outside of the quartz tube is connected in flow-through relationship with the space 13c between the double walls of the supporting tube at the lower parts of the quartz tubes and the tube unit via connection holes made in the inner wall of the tube unit. Said connection holes are designated 21 in FIGS. 4a and 4d. There are 8 layers of holes, with 12 holes per layer.

Through the arrangement shown with quartz tubes and the tube unit, the space 13c between the walls of the tube unit can serve as an outer flow channel for said combustion gases and the space between the quartz tube and the inner wall of the tube unit as an inner flow channel for the same combustion gases, which outer and inner flow channels are connected via said connection holes 21. The outer and inner flow channels are parallel to and encircle the quartz tube. As the inner flow channel emerges in the outlet channel 18 said combustion gas suction fan 7 will achieve convection in the heating gases which have been heated in the combustion chamber which by the suction are forced down into the outer flow channel, via the connection holes 21 and into and up in the inner flow channel and from there on out into the outlet channel 18. Through the counter-current convection obtained in the first and second flow channels, it will be possible for heat conduction to take place to the inner of the quartz tube, through said convection, and also through direct heat radiation from the heated parts of the supporting tube. The fan and the flow channels are adapted so that a speed of the combustion gases of 20-50 meters per second is obtained. The gas flow is cooled down successively during its passage through said flow channels and the heat conduction to the quartz tube through convection decreases successively. However, there is also the radiation heat. Through its radiation, the outer wall of the tube unit emits heat to the inner wall of the tube unit, and this, in turn, emits radiation heat to the quartz tube. The sum of the convection heat and the radiation heat will be more or less constant along a large portion of the length of the quartz tube, and in this way very uniform heating is obtained.

Also the heating of the substantially firmly fastened tube unit takes place unifomly, which involves that the walls of the tube unit will not bend and in this way affect the quartz tube inside, which is sensitive to mechanical stresses.

The quartz tube is centered in the tube unit at said seals 16, and also at the fastening unit 19. The tube rests with the major portion of its weight against a seat extending out and arranged in connection with the seal, so that a certain ball-bearing function is obtained in the support in question. See FIG. 3.

Figure 4B:
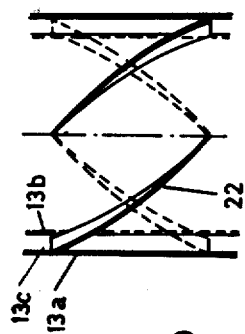
Figure 4C:
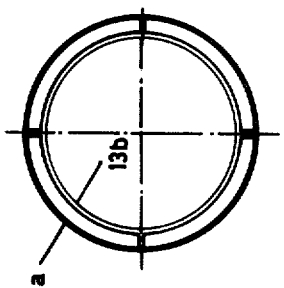
Figure 4D:
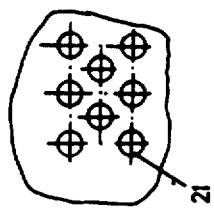
Figure 4A:
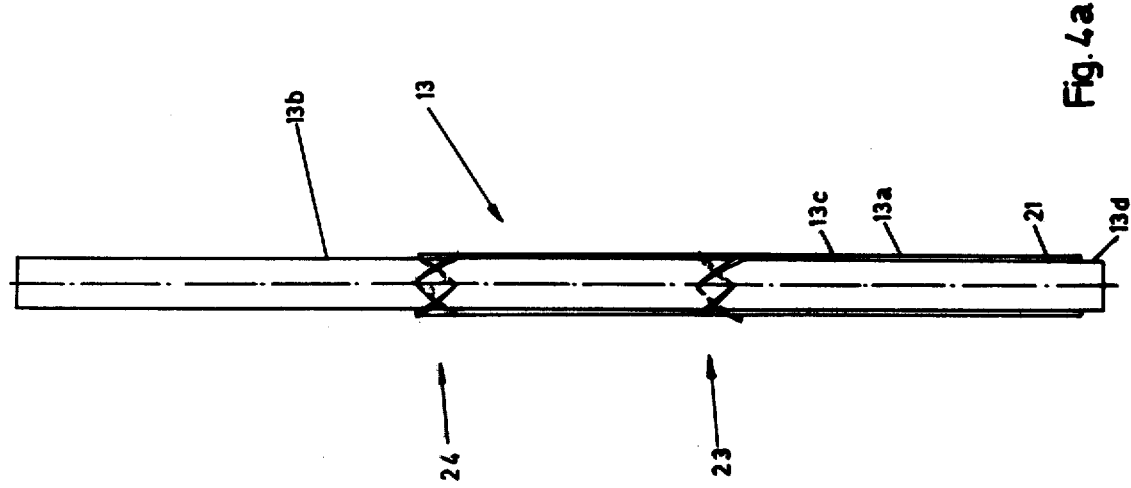

In order to achieve further improved distribution of the heat and heat conductivity at the quartz tubes and the tube units, as shown in FIGS. 4a-4c guide vanes 22 are arranged across the space 13c or the outer flow channel so that a vigorous turbulation of the heating gases is obtained in said outer flow channel. In the example of the embodiment shown, said guide vanes 22 are arranged at two different levels 23 and 24 on the tube unit. At each level, four guide vanes coact in the turbulation function, and each guide vane is then somewhat curved in its own plane and extends approx. 45° from a cross-section plane through the supporting tube at the end in question of the guide vane. Each guide vane covers one fourth of the circumference of the space and is fastened along one of its longitudinal sides to the inside of the wall 13a. The guide vane does not extend entirely over the whole of the space 13c, but only between 80-95% of this. To a certain extent, the guide vanes will serve as bracing elements for the walls in the tube unit.

Each tube unit is held via its inner wall via a protruding part 13d of the inner wall at the lower part of the tube unit in a fire-resistant cast iron plate 25, which is shown in FIG. 2a.

The inlets 3 and 4 for the acid which has been fed in comprise spreading devices 26 which spray the acid against the inner wall of the quartz tube in question, so that it runs downwards along the inner wall.

As shown in FIG. 3, the seals 16 comprise a first sealing ring 16a made of quartz or the like. Said first sealing ring rests against a flange 13e extending inwards on the tube unit 13. On top of the first sealing ring a second sealing ring 16b of quartz fibre or the like is arranged, which is contact with the first sealing ring via an oblique surface 16c. At the bottom, the quartz tube has a considerably tapered or reduced diameter portion 12a extending from the center of a wide spherical segment formed shoulder 12b. At said tapered part, inside the quartz tube, a bowl shaped reinforcing element 27 is arranged, which is fastened in the inner wall of the quartz tube. Said reinforcing element comprises a central outlet hole 28, which leads down into said tapered part.

Said tapered part 12a extends down into the collecting vessel to between 30 and 60% of the height of this, appropriately 40%, the height of the vessel then being between 10 and 20%, preferably 15%, of the length of the quartz tube.

Figure 5:
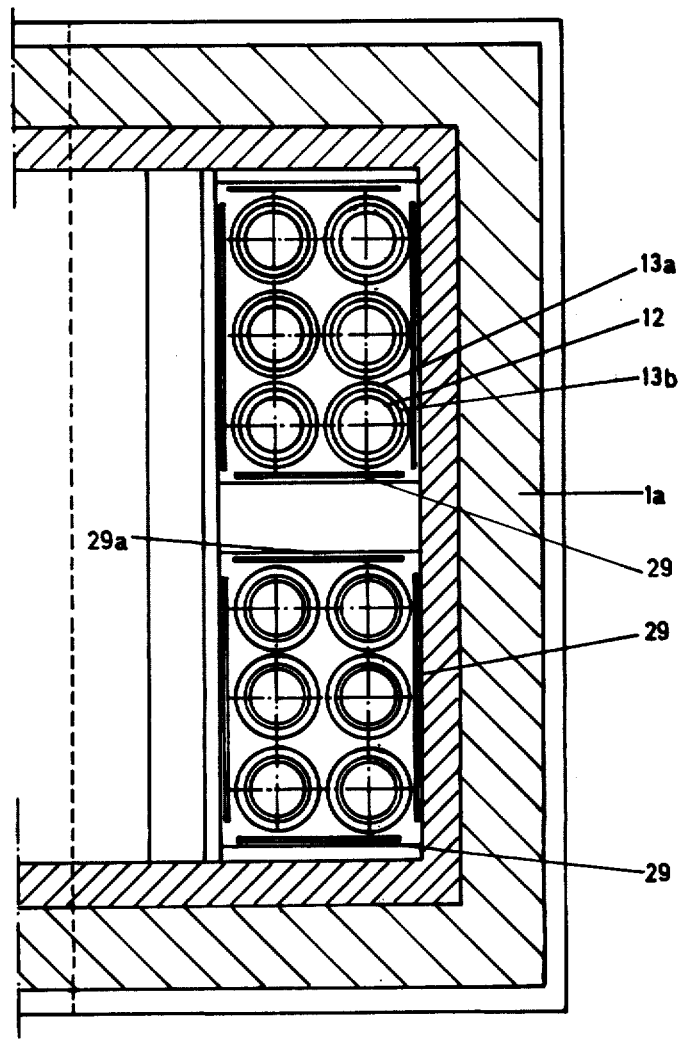

FIG. 2a shows the boundary walls of the furnace, designated 1a, 1b and 1c. FIG. 5 is intended to show the quartz tubes used in certain embodiments with their tube units in the supporting plates 29 bracing the respective modular unit. There are four plates 29 for each modular unit which enclose the tubes comprised in the modular unit in a rectangle. Supporting plates 29 coact with the outsides of the tube units, which are moreover in contact with each other so that a tube package is formed. When two separate tubes are used in the double walled tube unit, the outer tubes or the outer walls 13a can be fastened by means of screws 29a in said supporting plates.

Figure 6B:
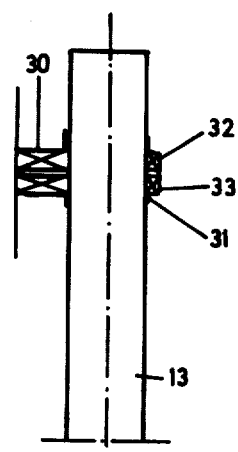
Figure 6C:
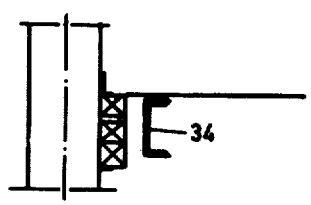
Figure 6A:
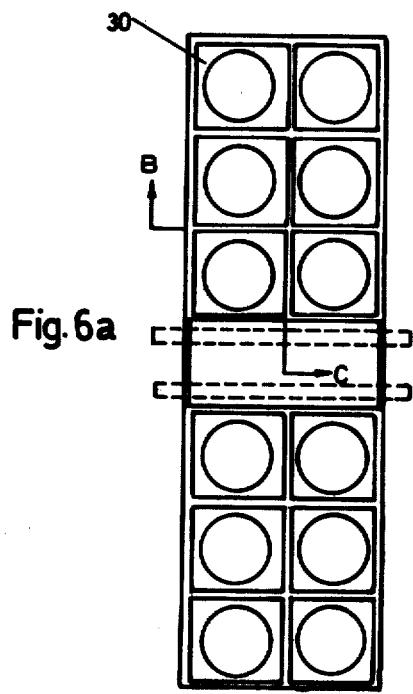

FIGS. 6a-6c are intended to show the seals 17 according to FIG. 2b in detail. The seals are inserted between two plates 30 and 31, of heat-resisting material, and provided with recesses. The actual heat seal comprises a ceramic felt 32, under which is applied a sealing plate 33 (Trito Board). The seals are supported by two beams 34 arranged over the space in question in the furnace. It is essential for the seals in question that they support the tube units laterally, at the same time as they permit at least a certain longitudinal displacement of the tube units in their longitudinal directions.

As regards the seals at the upper and lower parts of the furnace, these can consist of plates 19 and 25, respectively, appropriately of cast iron, in which such holes have been made that the respective quartz tube can be displaced axially in these holes. On top of e.g. the plate 19 a porous acid-resistant material, e.g. quartz wool 19a can be applied. On top of this porous acid-resistant material a further acid-resistant material can be arranged, which can give tight layers 19b, 19c, and for instance consist of ceramic felt, quartz sand with an appropriate grain distribution, board, etc. On top of the cast iron plate 25 a flanged plate 37 is applied, which is in contact with the plate 25 via insulating material. The vessel is sealed against the underside of the plate 25 in the corresponding way. The parts 25, 37 and 2 are held together by means of bolts.

In order to further increase the heat transmission to the acid fed to the quartz tube, in the present case packings known in themselves are applied inside the quartz tubes. Said packings give a larger total area and, accordingly, better rectification. The temperature at the top of the tube units can thereby be kept lower, which is of importance for the durability of the seals used at the top of the furnace.

With small packings, however, the risk for flooding of the liquid which runs down in the tube is increased, as in this case the liquid can be carried along and be dammed up by the gas flow directed upwards which occurs. This can be followed by a wave of liquid, resulting in irregular boiling. However, a prerequisite for flooding is a high gas speed. The gas speed is nearly zero at the the bottom of the respective quartz tube, and increases in relation to the heat conducted to a maximum at the top of the quartz tube.

With the ratios prevailing between liquid and gas at the top of the tube unit, the flow speed, i.e. the gas speed at which flooding can take place, with 25 mm packings is 2.5-3.0 m/sec., with 40 mm packings 3-4 m/sec., and with 50 mm packings 4-5 m/sec.

In the present case, the gas speed is calculated to be approx. 2.5 m/sec. at the top of the tube unit. At total evaporation of the liquid fed in, however, the gas speed may increase to twice this speed. However, total evaporation takes place only in exceptional cases.

In case packings are to be placed in the entire quartz tube in the case mentioned above, the packings at the top should not have a diameter of less than 40 mm. Up to half of the height of the quartz tubes, packings with a diameter of 25 mm can be used.

In certain embodiments it is also possible to limit the height of the packing layer, so that at the top of the packing layer a maximum gas speed of 1.5 to 2.0 m/sec. will be obtained. The liquid is then sprayed against the walls of the quartz tube with the aid of the spreading device 26 in the top of the quartz tube. Water is removed from the liquid which runs along the walls. When the liquid comes into contact with the layer of packings, the gas speed is adapted to 1.5-2.5 m/sec. so that the liquid is partly spread out over the layer of packings, i.e. the gas speed is adapted so that good spreading, but no flooding, takes place.

FIGS. 7a and 7b show examples of shapes of two different embodiments of packings, 35 and 36.

The packings consist of pieces of quartz tubes, for instance pieces of clear quartz, which in the following will be specified in three different dimensions, small dimensions, medium dimensions and large dimensions. By small dimensions of the packings is meant those which have a greatest extent of between one twentieth and one eighth, preferably one tenth of the inner diameter of the quartz tube in question. Medium sized packings are the pieces of quartz tube which have a maximum extent of between one eighth and one fifth, preferably one sixth, of the inner diameter of the quartz tube in question. By large packings is meant the pieces of quartz tube which have a maximum extent of between one fourth and one half, preferably one third, of the inner diameter of the long quartz tubes. Said pieces of quartz tube have substantially the same diameter and length, and can have the form shown by 35 in FIG. 7a. At least in the lower part of the quartz tube, the packings are chosen to have small or medium dimensions or a mixture of the two. In the upper part of the quartz tube, packings are chosen to have large dimensions.

According to the embodiment shown in FIG. 7b, a portion of the large, or medium packing may comprise a hemispheric shell or body, appropriately of quartz, in which holes have been made in or in the vicinity of the top of the dome, and which hemispheric body is placed with its underside or large open part at least substantially downwards in the quartz tube. When a plurality of such hemispheric bodies is used, these are placed at a distance of from 100 to 500 mm, preferably approx. 250 mm, from each other.

In the furnace which can be heated and the collecting vessel connected to it for concentrated acid, on one side the space which is intended for the heating means (the combustion gases) and on the other side the spaces over and/or under the respective seals are connected to pressure regulating equipment not specially shown which achieves that the pressure in the space for the combustion gas used for the heating is somewhat higher than the pressure in the other space or spaces.

When the device is started, the heating should appropriately take place slowly, so that temperature shocks which might lead to thermal rupturing are avoided. In the combustion chamber the working temperature is approx. 900° C., while the temperature in the outlet channel 18 is approx. 500° C.

The invention is not limited to the embodiment shown above as an example, but can be subject to modifications within the scope of the following claims.

We claim:

1. An improved apparatus for concentrating and purifying liquids, comprising:
    a source of hot gases;
    at least one elongated evaporating tube arranged upright in position to be heated by said gases, said at least one evaporating tube having an inner diameter and a height;
    means for feeding liquid at the top of said at least one evaporating tube so that the liquid runs down the inner wall of said at least one evaporating tube;
    packing pieces filling said at least one tube to a fraction of its height, each of said pieces having a maximum dimension in the range of from one-twentieth to one-fifth of said inner diameter, said fraction of said height being chosen so that the velocity of gases moving upward past said pieces at said fraction of said height is in the range of 1.5 to 2.0 meters per second, whereby liquid flowing down the inner wall of said at least one tube spreads over said packing pieces without flooding;
    means for collecting concentrated and purified liquid at the bottom of said at least one tube;
    means for conveying said gases adjacent at least a portion of said at least one evaporating tube to provide transfer of heat therebetween, said conveying means comprising inner and outer flow channels each at least partially surrounding said portion of said at least one evaporating tube, a lower portion of said outer channel being in fluid communication with a lower portion of said inner channel and an upper portion of said outer channel being in fluid communication with said source of hot gases; and
    means mounted in at least one of said inner and outer channels for causing turbulation of hot gases flowing therethrough, to enhance heat transfer between said hot gases and said at least one elongated evaporating tube.

2. Apparatus according to claim 1, wherein said collecting means comprises a vessel into which said at least one evaporating tube extends, the height of said vessel being in the range of one-tenth to one-fifth of the height of said at least one evaporating tube and said at least one evaporating tube extending into said collecting vessel to a depth of between three-tenths and three-fifths of the height of said vessel.

3. Apparatus according to claim 1, wherein said pieces are pieces of quartz tubes, each piece having its diameter substantially equal to its length.

4. Apparatus according to claim 1, wherein a portion of said pieces having a maximum dimension of from one-eighth to one-fifth of said inner diameter are hemispheric shells having holes in the tops of their hemispheric domes, said shells being oriented in said at least one evaporating tube with the undersides of their domes facing substantially downwardly.

5. Apparatus according to claim 4, wherein said hemispheric shells are placed in said at least one evaporating tube with a distance between them in the range of 100 to 500 millimeters.

6. Apparatus according to claim 1, wherein said source comprises a furnace and said at least one evaporating tube is located in said furnace, further comprising seals surrounding said at least one evaporating tube at the upper and lower parts of said furnace, each of said seals comprising an apertured plate through which said at least one evaporating tube extends, a layer of porous, liquid resistant material applied to the outer surface of said plate, and at least one layer of tightly packed liquid resistant material applied to said porous liquid resistant material.

7. An improved apparatus for concentrating and purifying liquids, comprising:
    a source of hot gases;
    at least one elongated evaporating tube arranged upright in position to be heated by said gases, said at least one evaporating tube having an inner diameter and a height;
    means for feeding liquid at the top of said at least one evaporating tube so that the liquid runs down the inner wall of said at least one evaporating tube;
    packing pieces filling said at least one evaporating tube, each of said pieces having a maximum dimension in the range of from one-twentieth to one-fifth of said inner diameter;
    means for collecting concentrated and purified liquid at the bottom of said at least one evaporating tube;
    means for conveying said gases adjacent at least a portion of said at least one evaporating tube to provide transfer of heat therebetween, said conveying means comprising inner and outer flow channels each at least partially surrounding said portion of said at least one evaporating tube, a lower portion of said outer channel being in fluid communication with a lower portion of said inner channel and an upper portion of said outer channel being in fluid communication with said source of hot gases; and
    means mounted in at least one of said inner and outer channels for causing turbulation of hot gases flowing therethrough, to enhance heat transfer between said hot gases and said at least one elongated evaporating tube.

8. Apparatus according to claim 7, wherein said collecting means comprises a vessel into which said at least one evaporating tube extends, the height of said vessel being in the range of one-tenth to one-fifth of the height of said at least one evaporating tube and said at least one evaporating tube extending into said collecting vessel to a depth of between three-tenths and three-fifths of the height of said vessel.

9. Apparatus according to claim 7, wherein said pieces are pieces of quartz tubes each piece having its diameter substantially equal to its length.

10. Apparatus according to claim 7, wherein a portion of said pieces having a maximum dimension of from one-eighth to one-fifth of said inner diameter are hemispheric shells having holes in the tops of their hemispheric domes, said shells being oriented in said at least one evaporating tube with the undersides of their domes facing substantially downwardly.

11. Apparatus according to claim 10, wherein said hemispheric shells are placed in said at least one evaporating tube with a distance between them in the range of 100 to 500 millimeters.

12. Apparatus according to claim 7, wherein said source comprises a furnace and said at least one evaporating tube is located in said furnace, further comprising seals surrounding said at least one evaporating tube at the upper and lower parts of said furnace, each of said seals comprising an apertured plate through which said at least one tube extends, a layer of porous, liquid resistant material applied to the outer surface of said plate, and at least one layer of tightly packed liquid resistant material applied to said porous liquid resistant material.

13. An improved apparatus for concentrating and purifying liquids, comprising:
    a source of hot gases;
    at least one elongated evaporating tube arranged upright in position to be heated by said gases, said at least one evaporating tube having an inner diameter and a height;
    means for feeding liquid at the top of said at least one evaporating tube so that the liquid runs down the inner wall of said at least one evaporating tube;
    packing pieces filling said at least one evaporating tube, said pieces comprising medium pieces each having a maximum dimension in the range from one-eighth to one-fifth of said inner diameter, and large pieces each having a maximum dimension in the range of from one-fourth to one-half of said inner diameter;
    means for collecting concentrated and purified liquid at the bottom of said at least one evaporating tube;
    means for conveying said gases adjacent at least a portion of said at least one evaporating tube to provide transfer of heat therebetween, said conveying means comprising inner and outer flow channels each at least partially surrounding said portion of said at least one evaporating tube, a lower portion of said outer channel being in fluid communication with a lower portion of said inner channel and an upper portion of said outer channel being in fluid communication with said source of hot gases; and
    means mounted in at least one of said inner and outer channels for causing turbulation of hot gases flowing therethrough, to enhance heat transfer between said hot gases and said at least one elongated evaporating tube.

14. Apparatus according to claim 1, 7 or 13, wherein said inner and outer flow channels are defined by a tube unit having an inner tubular wall spaced from said evaporating tube to define said inner flow channel and an outer tubular wall spaced from said inner tubular wall to define said outer flow channel, whereby said gases heat said inner and outer walls to cause them to radiate heat to said evaporation tube.

15. Apparatus according to claim 14, wherein said means for causing turbulation comprises at least one guide vane mounted in said outer flow channel and attached to at least one of said inner and outer walls, each said guide vane extending around a portion of the circumference, along a portion of the length and across a portion of the width of said outer flow channel.

16. Apparatus according to claim 15, wherein said guide vanes extend around one-fourth of said circumference, at approximately a 45° angle to the horizontal and across from 80 to 90 percent of the width of said outer flow channel.

17. Apparatus according to claim 13, wherein said medium pieces are positioned below said large pieces in said at least one evaporating tube.

18. Apparatus according to claim 13, further comprising small pieces having a maximum dimension in the range of one-twentieth to one-eighth of said inner diameter.

19. Apparatus according to claim 13, wherein said large pieces have a maximum dimension of approximately one-third of said inner diameter.

20. Apparatus according to claim 17, wherein said collecting means comprises a vessel into which said at least one evaporating tube extends, the height of said vessel being in the range of one-tenth to one-fifth of the height of said at least one evaporating tube and said at least one tube extending into said collecting vessel to a depth of between three-tenths and three-fifths of the height of said vessel.

21. Apparatus according to claim 13, wherein said pieces are pieces of quartz tubes each piece having its diameter substantially equal to its length.

22. Apparatus according to claim 13, wherein a portion of said large pieces are hemispheric shells having holes in the tops of their hemispheric domes, said shells being oriented in said at least one evaporating tube with the undersides of their domes facing substantially downwardly.

23. Apparatus according to claim 22, wherein said hemispheric shells are placed in said at least one evaporating tube with a distance between them in the range of 100 to 500 millimeters.

24. Apparatus according to claim 13, wherein said source comprises a furnace and said at least one evaporating tube is located in said furnace, further comprising seals surrounding said at least one tube at the upper and lower parts of said furnace, each of said seals comprising an apertured plate through which said at least one evaporating tube extends, a layer of porous, liquid resistant material applied to the outer surface of said plate, and at least one layer of tightly packed liquid resistant material applied to said porous liquid resistant material.

25. Apparatus according to claim 6, 12 or 24, wherein said apertured plate at said lower part of said furnace is fire resistant cast iron.

* * * * *